Sept. 3, 1963
D. J. NEWMAN
3,102,788
PRODUCTION OF PURE NITROGEN TETROXIDE
Filed Feb. 20, 1961
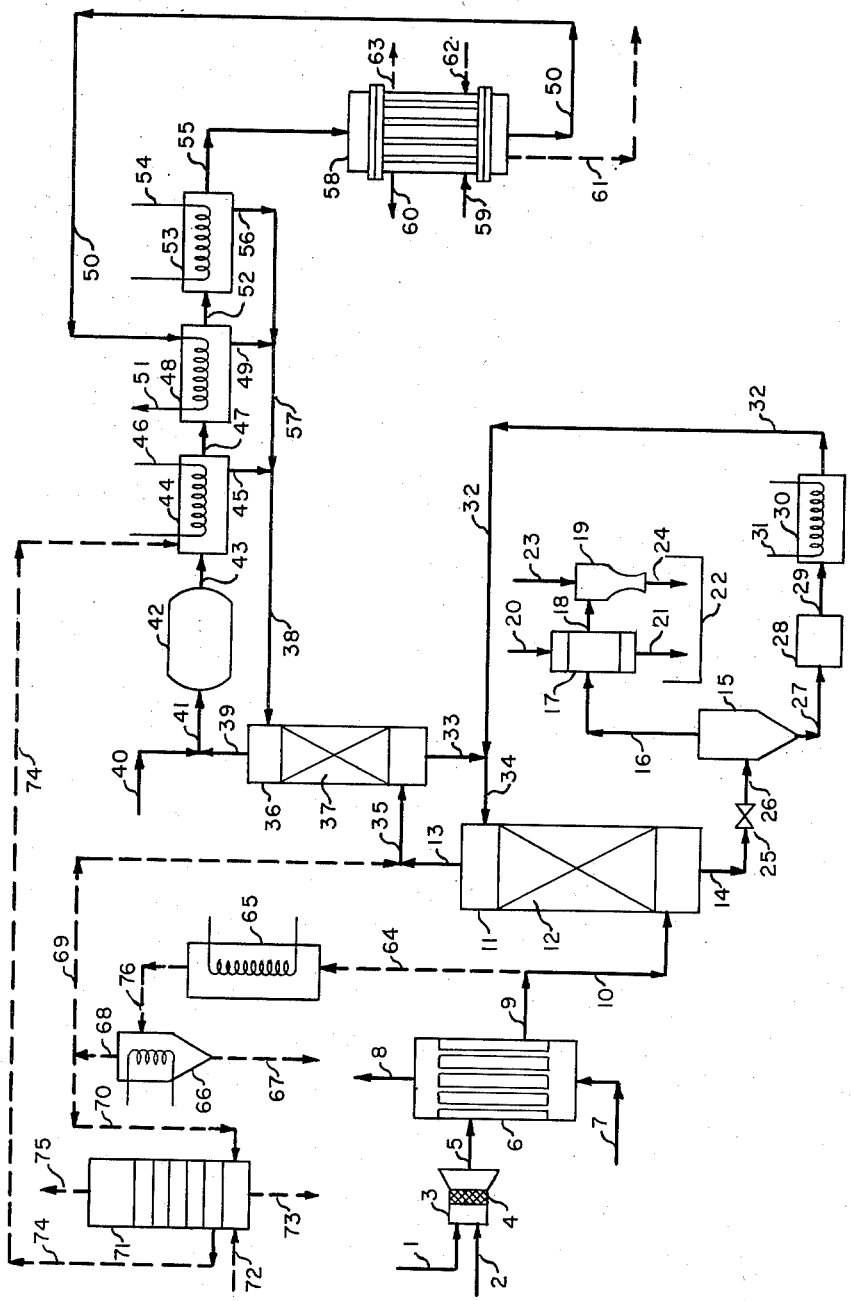
DANIEL J. NEWMAN
INVENTOR.
BY *J. J. Chaboty*
AGENT

United States Patent Office 3,102,788
Patented Sept. 3, 1963

3,102,788
PRODUCTION OF PURE NITROGEN TETROXIDE
Daniel J. Newman, Jackson Heights, N.Y., assignor to Chemical Construction Corporation, New York, N.Y., a corporation of Delaware
Filed Feb. 20, 1961, Ser. No. 90,363
6 Claims. (Cl. 23—161)

This invention relates to the production of pure nitrogen tetroxide by selective condensation from a pre-dried gas stream. The process of the present invention is particularly applicable to the production of nitrogen tetroxide as a side-stream product of an existing nitric acid facility, however, the process is also applicable to a gas stream derived directly from ammonia oxidation. In this case, the process features a complete recycle modification, whereby no byproduct nitric acid is produced.

Nitrogen tetroxide is useful as an oxidizing or nitrating agent, and is also used to fortify spent nitrating acids. In some applications, highly purified nitrogen textroxide is required, in the sense that other oxides of nitrogen as well as unrelated compounds must be substantially absent from the nitrogen tetroxide. The compound nitrogen textroxide may exist as a solid, liquid or gas, depending on temperature, however this compound is always in equilibrium with nitrogen dioxide, in accordance with the reversible reaction:

$$N_2O_4 \rightleftharpoons 2NO_2 \qquad (1)$$

In the following discussion and description of the present invention, when the compound is in the solid or liquid state it will be referred to as nitrogen textroxide, and when the compound is in the gaseous state it will be referred to as nitrogen dioxide. This is in accordance with usual terminology applied to this compound.

A particular embodiment of the present invention relates to the direct production of nitrogen tetroxide from a gas stream derived from the catalytic oxidation of ammonia, which stream contains nitrogen dioxide, water vapor, lower oxides of nitrogen and inert gases such as nitrogen. In a preferred case, such a gas stream is treated by a complete recycle modification so as to recover substantially all contained oxides of nitrogen as nitrogen tetroxide. However, it is also within the scope of the present invention to convert a portion of the contained nitrogen oxides into a side stream of strong nitric acid solution. In another and simpler version of the present invention, the process is applied to an existing nitric acid facility. In this case, a gas stream containing nitrogen oxides may be derived from the existing facility with a low water vapor content, and one process step may be omitted. It is even possible to obtain the input gas stream from an intermediate section of the nitric acid absorber in a nitric acid process, in which case the process is further simplified, as will be explained infra. The scope of the present invention also includes the utilization of off-gases rich in nitrogen dioxide such as those derived from nitration processes, as the input gas stream for the process.

Although several processes for producing pure nitrogen tetroxide have been suggested or developed in the past, the most favored commercial procedure employs concentrated nitric acid solution as an absorbent. In this process, a gas stream rich in nitrogen dioxide is scrubbed with the nitric acid, and nitrogen dioxide is absorbed into the liquid phase. The rich liquid is withdrawn and heated, thus liberating substantially pure nitrogen dioxide gas. This gas stream is cooled to produce nitrogen tetroxide as a liquid condensate.

The process of the present invention employs a more complex procedure, featuring refrigeration and selective condensation of impurities. In the present invention, the gas stream containing nitrogen dioxide is cooled to an intermediate level, so as to condense out all water vapor as nitric acid solution. It has been found that this cooling usually must be carried out in a series of stages or temperature levels, so as to achieve condensation and separation of water as nitric acid with a minimum amount of contained nitrogen dioxide. In other words, as will be described in detail infra, condensation of water in stages at several temperature levels achieves the separation of the water as dilute nitric acid in the earlier stages. Thus, this sequence of condensation permits a substantial amount of nitrogen dioxide to remain in the gas phase, for subsequent recovery as pure solid nitrogen tetroxide. Under most circumstances, condensation of all water in one process step would result in concomitant removal of practically all nitrogen dioxide. One exception to this does occur in certain nitration processes, from which an off-gas rich in nitrogen dioxide is recovered. This off-gas is usually so concentrated in nitrogen dioxide content that preliminary removal of water by condensation in one stage will still permit subsequent recovery of an economic amount of nitrogen tetroxide.

An additional novel aspect of the present invention involves a sequence of process steps whereby complete recycle is achieved, with complete recovery of nitrogen oxides from the input gas stream as nitrogen tetroxide and preliminary removal of water vapor from the gas stream by means of a dehydrating agent. Thus the production of byproduct nitric acid is avoided. In this embodiment, the cold nitric acid solution produced by condensation of water vapor from the gas stream is recycled to scrub-cool the dried hot input gas stream resulting from the primary dehydration step. The scrubbing of this gas stream by the nitric acid solution achieves a cooling of the gas stream and also enriches the gas stream in nitrogen dioxide. The residual dilute nitric acid solution then flows to the dehydrator for recovery of the remaining fixed nitrogen. This step is preferably accomplished by combining the solution with the dehydrating agent, and then passing the combined stream to the dehydrator.

The process of the present invention also includes a further novel sequence in that most of the water vapor is removed from the process gas stream by a dehydration agent, and thereafter residual water vapor is removed by condensation from the cooled process gas stream. Between these two stages of water removal, air or other oxygen-containing gas is added to the process gas stream to oxidize any nitric oxide which may be present as well as the nitric oxide which is subsequently formed when the condensed water vapor reacts with nitrogen dioxide to form nitric acid.

The procedure of the present invention possesses several important advantages compared to prior processes. A very pure product is obtained, free of lower oxides of nitrogen and water vapor. Since most of the process is carried out at low temperatures, corrosion is a minor problem. Selective condensation of water vapor, preferably in stages or intervals at different temperature levels, permits high recovery of nitrogen dioxide with low acid recycle. In the preferred embodiment of the invention, a complete recycle process sequence is featured whereby production of by-product nitric acid may be avoided.

It is an object of the present invention to produce pure nitrogen tetroxide.

Another object is to recover pure nitrogen tetroxide from a mixed gas stream containing water vapor, oxides of nitrogen and inerts.

A further object is to separate water vapor from a gas stream containing nitrogen dioxide by partial condensation.

An additional object is to condense the water vapor from a mixed gas stream containing nitrogen dioxide while preventing the concomitant removal of substantially all nitrogen dioxide.

Still another object is to produce nitrogen tetroxide from all of the oxides of nitrogen contained in a mixed gas stream containing water vapor, by means of a complete recycle process.

Still a further object is to remove a major portion of the water vapor from a mixed gas stream containing oxides of nitrogen by means of a liquid drying agent without removing the nitrogen oxides contained in the gas stream.

These and other objects and advantages of the present invention will become evident from the description which follows. Referring to the FIGURE, in which several variations of the invention are schematically illustrated, input ammonia stream 1 and primary oxidation air stream 2 are passed into catalytic ammonia burner 3. After the gas streams are mixed in the first section of burner 3, the mixed gas stream usually containing about 10.5% ammonia is ignited in catalyst section 4 and the ammonia is catalytically oxidized at a temperature in the region of 1650° F. to nitrogen oxides and water vapor. Catalyst 4 is usually a platinum or platinum-rhodium gauze type of catalyst. The hot gas stream now leaves burner 3 via 5, and passes through waste heat boiler 6 in which partial cooling of the gas stream takes place. Boiler feed water stream 7 is passed to the tubes of boiler 6 and generated steam is recovered via 8. The partially cooled gas stream leaves boiler 6 via 9, and is now at a temperature of about 500° F. or lower. This gas stream 9 typically contains, in mol percent, about 10% total nitrogen oxides, 18% water vapor, 6% oxygen, balance inerts. The inerts consist mostly of nitrogen derived from the primary oxidation air. Stream 9 will usually be at an elevated pressure, principally because at lower or atmospheric pressure the the size of equipment required to handle the larger gas volumes becomes prohibitive. A suitable and preferred operating pressure is 120 p.s.i.g., since above about 150 p.s.i.g. the conversion efficiency in the catalytic ammonia oxidation process described supra is lowered.

A principal version of the process of the present invention is the case in which the process is not associated with an existing nitric acid facility, but is instead a completely independent facility. In this case, as will appear infra, the process may be a complete recyle system producing only nitgrogen tetroxide, or in a simpler version a side stream of byproduct nitric acid may be produced. In any event, for the case of an independent facility the gas stream 9 now passes via 10 into dehydration unit 11, in which a major portion of the water vapor content is removed from the gas stream. Unit 11 may be provided with a fixed bed 12 of a suitable type of solid absorbent or adsorbent, in which case at least two units would be required, with alternate absorption and regeneration cycles. However, due to the corrosive nature of the high-temperature gas stream at this point, conventional solid dehydrating agents are not particularly suitable for this application. It has been found that certain liquid dehydration agents may be successfully employed for this purpose, such as concentrated sulfuric acid and aqueous solutions of inorganic salts such as calcium chloride and the nitrates of magnesium, calcium and potassium. Among these, magnesium nitrate solution is particularly most suitable since it is comparatively non-corrosive and has high absorption and regeneration efficiency.

Thus, dehydration unit 11 is preferably provided with a bed 12 which consists of a packed section for gas-liquid contact. Other means for gas-liquid contact, such as bubble cap plates, may alternatively be employed in unit 11. The rising gas stream inside unit 11 is thus dried by contact with magnesium nitrate solution, and leaves via 13 at a temperature of about 250° F. to 350° F. with 5% or less residual water vapor content. The magnesium nitrate solution containing excess absorbed water vapor is removed from unit 11 via 14, typically at a temperature of about 350° F. to 400° F. as a 60% to 68% magnesium nitrate solution. Stream 14 is regenerated by re-concentration, usually by flashing the solution to a sub-atmospheric pressure between about 1" to 25" Hg absolute. Stream 14 is thus passed via control valve 25 and line 26 to vacuum flash tank 15. Water vapor removal and vacuum effect is maintained over tank 15 by line 16, which extends to barometric condenser 17 and thereafter via 18 to steam jet 19. Condenser 17 and jet 19 operate by conventional means to provide water vapor condensation and vacuum effect respectively. Thus condenser 17 is provided with cooling water feed 20 and water outlet 21 extending to seal tank 22, while jet 19 receives motive steam via 23 with jet outlet line 24 also extending to seal tank 22.

The re-concentrated magnesium nitrate solution, now of a solution strength between 68% to 78%, is removed via 27 from flash tank 15 and is raised to the required elevated pressure for recycle by pump 28. The re-concentrated solution now passes via 29 to optional heat exchanger 30 for preliminary adjustment of temperature to about 250° F. to 350° F. Unit 30 is provided with coil 31 through which heat exchange medium is circulated. Depending on relative circulation rates, stream 29 may be heated or cooled in unit 30. The solution leaves 30 via 32 and is now suitable for recycle to the gas drying section. It should be noted that in some instances unit 30 may be omitted. A dilute nitric acid solution 33 is preferably added to stream 32, in order to provide a complete recycle process, which is the preferred embodiment of the present invention. The combined process stream 34 now passes into unit 11 for further drying of the gas stream. It should be understood that solution 33 may alternatively be combined with stream 34 by separately passing the two streams into unit 11. The dilute nitric acid stream 33 contained in combined stream 34 is decomposed into nitrogen dioxide and water in unit 11 by reaction with nitric oxide derived from stream 10, in accordance with the reaction:

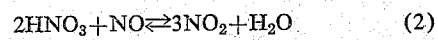

$$2HNO_3 + NO \rightleftarrows 3NO_2 + H_2O \qquad (2)$$

As is well known to those skilled in the art, this is the reaction which takes place and proceeds to the left during the formation of nitric acid by nitrogen dioxide absorption. The water formed by this reaction, as well as the water derived from stream 33, remains in the liquid dehydrating solution, while the nitrogen dioxide and equilibrium quantities of nitric acid joint the process gas stream 13.

Partially dried process gas stream 13 is now preferably passed via 35 to gas scrubber 36, which is a tower provided with packed section 37 or other gas-liquid contact means. Stream 35, entering unit 36 at a temperature of about 250° F. to 350° F., is scrubbed in unit 36 and reacted with a cold recycle stream 38 consisting of a combined nitric acid solution containing dissolved nitrogen oxides derived at an average temperature of about 50° F. to 100° F. from later stages of the process. The reaction in unit 36 between the rising gas stream and the cold recycle solution serves two purposes. First, the gas stream is cooled by the liquid solution, and consequently leaves unit 36 via 39 at a reduced temperature of about 150° F. In addition, further nitrogen dioxide is added to the gas stream by decomposition of some of the nitric acid contained in stream 38, due to reaction with nitric oxide contained in stream 35, and by vaporization of dissolved oxides. This process reaction is the same as that which occurs between process streams 34 and 10, and has been described supra. The residual liquid phase, now consisting of a warmed nitric acid solution of about 40% acid strength, is removed from unit 36 via 33 and added to dehydrating agent stream 32 as described supra.

Process gas stream 39, removed from unit 36 at a temperature of about 150° F., now contains a substantial amount of nitrogen dioxide and is reduced in nitric oxide content due to reaction of the nitric oxide with oxygen in the gas stream, see Reaction 3 infra, as well as reaction of the nitric oxide with nitric acid as described supra, see Reaction 2. The gas stream 39 generally contains a proportion of residual oxygen which is less than that required to combine with the remaining nitric oxide content in the gas stream, since provision of sufficient excess air for this in stream 2 reduces the efficiency of unit 3. Thus, secondary air stream 40 is now added to stream 39 to form mixed gas stream 41. It should be understood that the mixing of these streams immediately generates heat. Consequently, streams 39 and 40 may be precooled by means not shown, and also air stream 40 may be predried to lower the total water content of the mixed gas stream 41. Stream 41 is passed to retention tank 42 in which further oxidation of nitric oxide to nitrogen dioxide occurs, in accordance with the reaction:

$$2NO + O_2 \rightarrow 2NO_2 \qquad (3)$$

Reaction 3 proceeds at a relatively slow rate and consequently a separate unit 42 will usually be required to provide retention time. In some instances, however, the nitric oxide content of stream 41 may be fairly low, and consequently vessel 42 may be omitted in certain cases, with Reaction 3 taking place only in the gas cooler-condensers described infra. Reaction 3 is exothermic, and consequently the process stream 43 obtained from vessel 42 will be heated, usually to a temperature between about 250° F. to 290° F. Gas stream 43 now consists principally of nitrogen dioxide, small amounts of nitric oxide, residual water vapor, excess oxygen, and inerts principally nitrogen.

Stream 43 is now cooled in order to condense and remove residual water vapor, which condenses and reacts with nitrogen dioxide to form nitric acid. As mentioned supra, in certain isolated cases, such as off-gases from nitration processes, the nitrogen dioxide content of the gas stream will be so great that the condensation of water vapor may be completely carried out in one stage. This results in concomitant removal from the gas stream of a relatively large amount of nitrogen dioxide, and in a general case the single-stage condensation of water vapor will result in removal of excessive amounts of nitrogen dioxide from the gas stream. Thus, one novel aspect of the process of the present invention comprises the fractional condensation of the water vapor from the gas stream 43 in a plurality of stages at descending temperature levels. Usually three or more stages are required in order to provide effective differential condensation of water vapor.

Therefore, in a preferred embodiment of the process, condensation and removal of water vapor is produced in three stages. As indicated on the figure, stream 43 thus passes into first stage condenser 44, and is cooled from an inlet temperature of about 250° F. to 290° F., to a final temperature of about 100° F. to 120° F. Condensation of nitric acid solution takes place, with removal of liquid condensate via 45. Cooling is provide by coil 46, through which cooling water or other suitable cooling medium is passed. As described supra, due to this partial cooling to an intermediate temperature level, the principal component which is condensed from the gas stream is water vapor. In all cases a certain amount of nitrogen dioxide will react with the condensed water to produce nitric acid, in accordance with the reverse of equilibrium Reaction 2 supra. In addition some nitrogen oxides will dissolve in the solution. However, since the temperature level in unit 44 is relatively high, only a small amount of nitrogen dioxide will react and dissolve in this manner, and consequently stream 45 will essentially consist of a dilute nitric acid stream.

The residual gas stream, now depleted in water vapor content, leaves unit 44 via 47 at a temperature of about 100° F. to 120° F. It should be noted that the condensation of stream 45 results in the formation of nitric oxide in the gas stream, in accordance with reversible Equation 2 supra, reacting to the left. However, all such nitric oxide is re-oxidized fairly rapidly due to the low temperature and the presence of excess oxygen in the gas stream, previously added via 40.

Process gas stream 47 is now further cooled to another intermediate temperature level of about 50° to 70° F. in heat exchanger 48. An additional amount of nitric acid solution with dissolved nitrogen oxides is condensed and removed via 49. It should be noted that, as described supra, solution 49 will be considerably stronger than solution 45 previously condensed, due primarily to the lower temperature level during condensation. Exchanger 48 may be cooled with any suitable heat exchange medium, however, unit 48 is preferably a gas-to-gas type of heat exchanger, with cooling gas stream 50 consisting of recycled cold tail gas derived from the final stage of the process. The resulting warmed tail gas stream 51 may be further heated in auxiliary waste heat units not shown, and thereafter expanded through a gas turbine for power recovery.

The process gas stream leaves unit 48 via 52 at a temperature of about 50° F. to 70° F., and is now virtually free of water vapor. Final purification takes place in refrigerated heat exchanger 53, which is cooled by refrigeration coil 54. In unit 53 the process gas stream is cooled to the lowest intermediate temperature level of the process, between about 20° F. to 40° F., by heat exchange with a refrigerant such as ammonia or Freon in coil 54. The temperature of the gas stream 55 leaving unit 53 is preferably usually maintained at about 32° F., and the condensate formed is mostly nitrogen tetroxide with final traces of water and dissolved acid. Exiting gas stream 55 is now completely purified with respect to water vapor, and contains about 3.5% nitrogen dioxide, 3.5% free oxygen, balance other non-condensable inerts. Less than 0.03% residual water vapor and nitric acid is present in the gas stream at this point.

Strong nitric acid solution 56 is also removed from unit 53. In one aspect of the invention, streams 56, 49 and 45 may be separately recovered as a by-product nitric acid solution, or may be recycled to an associated nitric acid facility. However, in a preferred complete recycle embodiment of the invention, streams 56 and 49 are combined to form stream 57, which is further combined with stream 45 to form recycle cold nitric acid solution 38. The subsequent processing of stream 38 in unit 36 has been described supra.

Returning now to unit 53, final process gas stream 55 is now passed to refrigerated heat exchanger 58, which is typically a cryogenic-type unit cooled by a liquefied refrigerant admitted via 59 and subsequently removed as a vapor or gas via 60. The gas stream is further cooled in unit 58 to a final temperature of about −30° F. to −50° F., in order to remove and recover the nitrogen dioxide content of the gas stream by condensation. Thus, the nitrogen dioxide deposits on the cooling surfaces of unit 58 as solid nitrogen tetroxide. The final cold tail gas, now free of nitrogen tetroxide, is removed via 50 at a temperature of about −30° F. to −50° F. and preferably recycled for use as a coolant in heat exchange, as described supra.

The deposited solid nitrogen tetroxide may be recovered from unit 58 in various ways. Mechanical scrapers may be employed to dislodge the deposited solid product for removal via 61. A suitable inert liquid solvent may be periodically or continuously dispersed on the cooling surfaces of unit 58 to dissolve and wash off the nitrogen tetroxide, with recovery of a product solution via 61. One preferred system consists in the use of dual exchangers or a plurality of exchangers 58, with alternating deposition and product recovery in switching sequence. In this case, either of the above methods could be employed for final product recovery, however, a preferred method consists of merely circulating a warmed gaseous or liquid refrigerant through the unit during the recovery period, such as intermittent inlet stream 62 and outlet stream 63, indicated as dashed lines on the figure. The warming effect thus melts the deposited nitrogen tetroxide, which is recovered via 61 as a pure liquid product. In most cases warmed refrigerant derived from heat exchange coil 54 may be utilized as stream 62.

Numerous modifications may be practiced within the scope of the present invention. Thus, as mentioned supra, secondary air stream 40 may be precooled and predried. As an alternative, stream 40 may be added to process gas stream 10 before the drying step in unit 11, thus eliminating separate drying of the secondary air and also providing a greater time interval for oxidation of nitric oxide.

As discussed supra, various alternative liquid drying agents may be employed in unit 11, to remove most of the water vapor from the process gas stream. Thus for example, 93% or 98% sulfuric acid solution could be suitably employed for this purpose. In the case of 93% acid solution, the resulting diluted acid stream 14 would be recovered with an acid strength of about 80%, and could be reconcentrated by any suitable means. Similarly, 98% acid solution is diluted to about 85% strength for best operation of the process. Concentrated solutions of certain inorganic salts such as calcium nitrate, potassium nitrate or calcium chloride may also be employed as suitable drying agents under the proper operating conditions. In all cases it should be noted that a sufficiently elevated temperature must be maintained in the operation of unit 11 so as to preclude any pickup or dissolving of oxides of nitrogen into solution 14, since such pickup would obviously result in a process loss.

In this general connection it should be understood that the various operating conditions and ranges recited in the description of the process supra represent merely preferred ranges of the operating variables, selected so as to achieve maximum efficiency and optimum results in operation of the process. Hence, these operating conditions and ranges are not intended to be considered as limitations or restrictions as to the novelty of the process of the present invention.

One important modification of the present invention involves the application of the process to an existing nitric acid facility, so as to produce a sidestream of nitrogen tetroxide as an alternative or additional product. Pertinent aspects of this modification have been shown on the figure. Thus, partially cooled gas stream 9, derived from ammonia burner 3 and containing nitrogen oxides, water vapor, oxygen and inerts, may be passed as shown on the figure by dashed line 64 to a typical nitric acid production facility. As a first step in nitric acid production, the gas stream 64 is partially cooled in gas cooler 65, and then passed via 76 to condenser 66, in which the stream is further cooled to condense out water vapor in the form of dilute nitric acid drips stream 67. In a nitric acid plant, stream 67 is re-combined with the main process stream at a suitable later stage of the process.

The residual gas stream is now removed from condenser 66 via 68, and is low in water vapor content. Thus, a portion of stream 68 may be split off from the main nitric acid process sequence via 69, and utilized to produce nitrogen tetroxide. Stream 69 would roughly correspond in composition to stream 13 described supra, except that stream 69 would contain relatively less fixed nitrogen because of the great amount of water vapor condensed in unit 66. Hence, in one embodiment of the process modification, stream 69 could be added to stream 13 to form stream 35. In the case of an existing nitric acid facility, the drying in unit 11 could be completely omitted and all of stream 9 passed through units 65 and 68. In this case, stream 69 would form stream 35.

Referring back to condenser 66, in a conventional nitric acid plant the process gas stream 68 now passes via 70 to absorber-oxidizer 71. Oxidation and bleach air is shown typically passing into unit 71 via 72. Product nitric acid is removed from unit 71 via 73, while tail gas is discharged via 75. Unit 71 accomplishes the final oxidation and absorption into the liquid phase of nitrogen oxides contained in stream 70, in accordance with established nitric acid technology. In one alternative modification of the present invention, a gas phase stream 74 may be tapped off from an existing absorber unit 71 in a nitric acid facility, and utilized as a nitrogen dioxide source for nitrogen tetroxide production. In this case, stream 74 would contain the required amount of excess free oxygen and hence stream 74 would be directly passed to the first stage of partial water vapor condensation in unit 44, as indicated. Subsequent processing of stream 74 would follow the procedure and process steps of the invention as described supra. When the process of the present invention is employed in conjunction with an existing nitric acid facility, an important advantage is automatically obtained. This advantage consists in the fact that condensed water vapor, which is removed from the process gas stream as nitric acid solution, may be readily utilized in the existing nitric acid facility as part of the overall process output. Hence the recycle or other disposal steps which are part of the main process as described supra may be eliminated.

As will be readily apparent to those skilled in the art, other process steps may readily be altered, combined or otherwise modified within the scope of the present invention.

What I claim is:

1. Process for recovering nitrogen tetroxide from a gas stream containing water vapor, nitrogen oxides and inerts with internal recycle of nitric acid solution which comprises scrubbing said gas stream with a liquid dehydrating agent selected from the group consisting of magnesium nitrate solution and concentrated sulfuric acid at an elevated pressure up to 150 p.s.i.g. and a temperature between 250° F. to 350° F. to remove water vapor, cooling the dried gas stream to between 110° F. to 150° F., combining an oxygen-containing gas with said gas stream whereby at least a portion of the nitric oxide present is oxidized to nitrogen dioxide and the combined gas stream is heated, cooling said gas stream by a plurality of partial condensation stages to between 20° F. to 40° F. whereby nitric acid solution is condensed and removed as a liquid, combining said liquid nitric acid solution with said liquid dehydrating agent prior to said gas scrubbing step, whereby the nitric acid contained in said liquid nitric acid solution is decomposed by reaction with nitric oxide in said gas stream to form gaseous nitrogen dioxide in said gas stream, and the water content of said liquid nitric acid solution is absorbed into said liquid dehydrating agent, and further cooling the residual gas stream to between −30° F. to −50° F. whereby substantially pure solid nitrogen tetroxide is deposited from said gas stream.

2. Process of claim 1, in which said liquid dehydrating agent containing absorbed water is at least partially regenerated by flashing the solution to a sub-atmospheric pressure between 1 inch Hg and 20 inches Hg absolute whereby absorbed water is vaporized and separated from said liquid, and thereafter the residual liquid is re-pressurized to said elevated pressure and recycled to said gas stream scrubbing.

3. Process of claim 1, in which said combined gas stream is cooled from an initial temperature of between 250° F. to 290° F. to an intermediate temperature by heat exchange with an external coolant, and further cooled from said intermediate temperature to between 50° F. to 70° F. by heat exchange with cold residual gas stream, said cold residual gas stream consisting of the residual gas stream remaining after deposition of solid nitrogen tetroxide.

4. Process of claim 1, in which said dried gas stream produced from said scrubbing with a liquid dehydrating agent is at least partially cooled and also enriched in nitrogen dioxide by further scrubbing said dried gas stream with said nitric acid solution in a second gas scrubbing step, prior to said combining of the gas stream with oxygen-containing gas and prior to said combining of liquid nitric acid solution with liquid dehydrating agent.

5. Complete recycle process for producing nitrogen tetroxide from a gas stream containing water vapor, nitrogen oxides and inerts which comprises a first scrubbing of said gas stream with a combined dehydrating solution containing magnesium nitrate at an elevated pressure up to 150 p.s.i.g. and a temperature between 250° F. to 350° F. whereby said gas stream is dried to about 4% water vapor content, a second scrubbing of said gas stream with recycled nitric acid solution whereby said gas stream is cooled to about 150° F. and also enriched in nitrogen dioxide content, combining the remaining dilute nitric acid solution with regenerated magnesium nitrate solution to produce said combined dehydrating solution, flashing the dehydrating solution recovered after said first scrubbing step to a lower pressure whereby at least a portion of the water content is vaporized and removed from said solution, compressing the regenerated solution prior to combining said solution with said dilute nitric acid solution, cooling said enriched gas stream after said second scrubbing from about 150° F. to about 110° F., adding air to said cooled gas stream whereby at least a portion of the nitric oxide present is oxidized to nitrogen dioxide and the combined gas stream is heated to between 250° F. to 290° F., cooling said gas stream to between 110° F. to 150° F. by a first heat exchange whereby a first nitric acid solution is condensed from said gas stream, further cooling said gas stream to between 60° F. to 90° F. by a second heat exchange with cold residual inert gas whereby second nitric acid solution is condensed from said gas stream, further cooling said gas stream by a third heat exchange to about 32° F. whereby third nitric acid solution is condensed from said gas stream and the residual gas stream contains essentially only nitrogen dioxide and non-condensable inerts, combining said first, second and third nitric acid solutions and recycling the combined solution to said second gas scrubbing as said recycled nitric acid solution, cooling said residual gas stream to about −40° F. whereby substantially all nitrogen dioxide is deposited from the gas stream as solid nitrogen tetroxide, recycling the residual gas stream to said second heat exchange as said cold residual inert gas and thereafter discharging warmed residual inert gas, and subsequently recovering said deposited solid nitrogen tetroxide by heating and melting said solid to form pure liquid nitrogen tetroxide product.

6. Process of claim 5, in which said gas stream is scrubbed in said first scrubbing step with said combined dehydrating solution at a pressure of about 120 p.s.i.g.

References Cited in the file of this patent
UNITED STATES PATENTS

| | | |
|---|---|---|
| 1,057,052 | Guye | Mar. 25, 1913 |
| 1,989,267 | Caro | Jan. 29, 1935 |
| 2,647,822 | Pike | Aug. 4, 1953 |
| 2,716,631 | Bechtel | Aug. 30, 1955 |
| 2,860,035 | Mandelik | Nov. 11, 1958 |